United States Patent [19]
Halsey et al.

[11] Patent Number: 6,091,168
[45] Date of Patent: Jul. 18, 2000

[54] ROTOR FOR A DYNAMOELECTRIC MACHINE

[75] Inventors: David G. Halsey; Hassan Mansir, both of Rockford; Robert Grennan, Stillman Valley; William J. Greenlee, Caledonia; Dam Nguyen, Rockford, all of Ill.

[73] Assignee: Hamilton Sundstrand Corporation, Windsor Locks, Conn.

[21] Appl. No.: 09/218,653

[22] Filed: Dec. 22, 1998

[51] Int. Cl.<sup>7</sup> ....................................................... H02K 9/00
[52] U.S. Cl. ................... 310/61; 310/58; 310/59; 310/60 A; 310/65; 310/156; 310/269; 310/166; 310/168; 310/261
[58] Field of Search ................... 310/61, 59, 58, 310/65, 60 A, 156, 269, 166, 168, 261

[56] References Cited

U.S. PATENT DOCUMENTS

| | | | |
|---|---|---|---|
| 4,395,816 | 8/1983 | Pangburn | 29/598 |
| 4,442,371 | 4/1984 | Utsunomiya et al. | 310/260 |
| 4,908,537 | 3/1990 | Sismour, Jr. | 310/51 |
| 5,369,325 | 11/1994 | Nagate et al. | 310/156 |
| 5,666,015 | 9/1997 | Uchibori et al. | 310/261 |
| 5,703,421 | 12/1997 | Durkin | 310/61 |
| 5,801,463 | 9/1998 | Suzuki et al. | 310/51 |
| 5,861,700 | 1/1999 | Kim | 310/261 |

*Primary Examiner*—Nestor Ramirez
*Assistant Examiner*—Thanh Lam
*Attorney, Agent, or Firm*—Wood, Phillips, VanSanten, Clark & Mortimer

[57] ABSTRACT

Losses in efficiency of operation of a dynamoelectric machine as a result of eddy current losses and poor coolant efficiency and/or disruption of the magnetic circuit in a rotor by coolant passages is avoided in a dynamoelectric machine including a stator (18) in which a rotor (16) is journaled. The rotor includes a stack (16) of thin laminations (17) made of a ferromagnetic material to define a rotor body. The rotor body includes a plurality of equally angularly spaced poles (58) separated by recesses (64). Coolant passages (76) located in the rotor at or just radially inward of the base (72) of each pole (58) and substantially radially outward of the rotational axis (56) of the rotor (14) to maximize cooling efficiency of the poles (58) without disrupting the magnetic circuit in the rotor. Slots (80) are placed in the tips (70) of the poles (58) of selected laminations (17) and extend generally radially inward to reduce eddy current losses.

12 Claims, 4 Drawing Sheets

ROTOR FOR A DYNAMOELECTRIC MACHINE

FIELD OF THE INVENTION

This invention relates to rotors for dynamoelectric machines, and more specifically, to a rotor having improved efficiency for such machines.

BACKGROUND OF THE INVENTION

Dynamoelectric machines conventionally include stacks of laminations made up of magnetic material as part of their rotor construction. In many cases, heat is generated in the lamination stack as a result of eddy currents induced by magnetic fields generated during operation of the machine or as a result of hysterisis losses. If the rotor is provided with an electrical winding, the lamination stack may be heated as a result of heat transfer from electrical windings which in turn heat up during the operation of the machine as a result of $I^2R$ losses. Over the years, many efforts have been made to prevent lamination stacks of the sort mentioned above from overheating. For example, the use of stacks of laminations itself is employed to reduce eddy current losses which in turn reduces the heat generated in the rotor. Moreover, it is common to include a fan on the motor shaft for drawing or propelling the coolant, typically ambient air, across machine components including the lamination stack.

It has also been conventional to provide coolant passages in the lamination stack and flow a coolant that may range from ambient air to oil to a refrigerant through such passages for cooling purposes. While such schemes have worked well for their intended purpose, energy must be expended to flow an adequate amount of coolant through the coolant passageways to prevent undesirably high temperatures from being attained. The energy used for this purpose lowers the overall efficiency of the machine. Moreover, as the coolant passages are inherently characterized by the lack of magnetic material in the cross section of the coolant passage, magnetic inefficiency may result which in turn may require the use of a somewhat larger rotor to prevent undesirable magnetic saturation occurring in parts of the rotor whereat coolant passages are located. The greater rotor mass also leads to operational inefficiencies.

Consequently, there is a real need for a dynamoelectric machine having a rotor wherein eddy current losses are further reduced and wherein the rotor may be adequately cooled without interfering with magnetic flux in the rotor during operation of the machine incorporating the rotor. The present invention is directed to providing a rotor with reduced eddy current losses and improved cooling without disrupting the magnetic efficiency of the rotor to provide an overall increase in the efficiency of operation of the dynamoelectric machine.

SUMMARY OF THE INVENTION

It is the principal object of the invention to provide a dynamoelectric machine with a new and improved rotor. More specifically, it is an object of the invention to provide such a machine with a means for both reducing eddy current losses thereby reducing the need for cooling and for providing improved cooling that will not disrupt magnetic efficiency within the rotor itself.

According to one facet of the invention, an exemplary embodiment of the invention achieves the foregoing object in a dynamoelectric machine including a stator and having a rotor journaled for rotation about an axis within the stator.

The rotor includes a rotor body having "n" axially elongated poles spaced from one another by axially extending recesses between adjacent poles with each pole having a base and a tip. An axial coolant passage is located at or radially inward of the base of each of the poles and entirely radially outward of the axis at a location closer to the pole tips than to the axis.

As a consequence of the foregoing construction, the coolant passage does not narrow the magnetic flux path from one pole to another to the point where it could be saturated to reduce magnetic efficiency.

According to a highly preferred embodiment of the invention, additional axial cooling passages are disposed in the body and are located just radially inward of the recesses.

In a preferred embodiment, means are provided for flowing coolant through the passages and comprise vanes on the ends of the rotor for flowing a gaseous coolant through the passages. Additionally, radial passages extend to the axially extending passages from the periphery of the rotor, generally centrally thereof. Coolant may therefore flow from both ends of the rotor to the radial passages to be discharged therefrom, minimizing the possibility of the creation of hot spots in the rotor.

According to another facet of the invention, there is provided a dynamoelectric machine that includes a stator and a rotor mounted for rotation about an axis within the stator. The stator includes at least two circumferentially spaced poles, with each stator pole extending axially along the stator and having a radially inner surface. The rotor includes at least two circumferentially spaced poles, with each rotor pole extending axially along the rotor and having a radially outer surface spaced from the radially inner surface of the stator poles by a radial gap R. At least one of the rotor and stator poles is formed from one or more stacks of thin laminations of magnetic material with the planes of the laminations extending nominally perpendicular to the axis. Each of the one or more stacks has a first end axially spaced from a second end. One or more of the laminations of the one or more stacks includes a plurality of slots arranged to reduce transverse eddy currents in at least one of the rotor and stator poles caused by magnetic flux fringes from the magnetic flux passing through the radial gap R. The one or more laminations are limited to first and second axial zones extending an axial distance L from the first and second ends, respectively, towards the opposite end of the associated one or more stacks, with L being in the range of 5 to 15 times the radial gap R.

The slots in the poles are operative to reduce eddy current losses in the poles and thereby reduce the amount of heat generated within the rotor by such losses to increase operational efficiency of the machine.

Preferably, the rotor body includes coolant passages for cooling the rotor and, as a result of the reduced heating of the rotor from reduced eddy current losses, adequate cooling may be more readily obtained with a reduced amount of energy expended in flowing a coolant through the coolant passages.

In a highly preferred embodiment, there is an axial coolant passage at or radially inward of the base of each pole and located on the center line of the corresponding pole.

Other objects and advantages will become apparent from the following specification taken in connection with the accompanying drawings.

DETAILED DESCRIPTION OF THE PREFERRED EMBODIMENT

Figure 1:
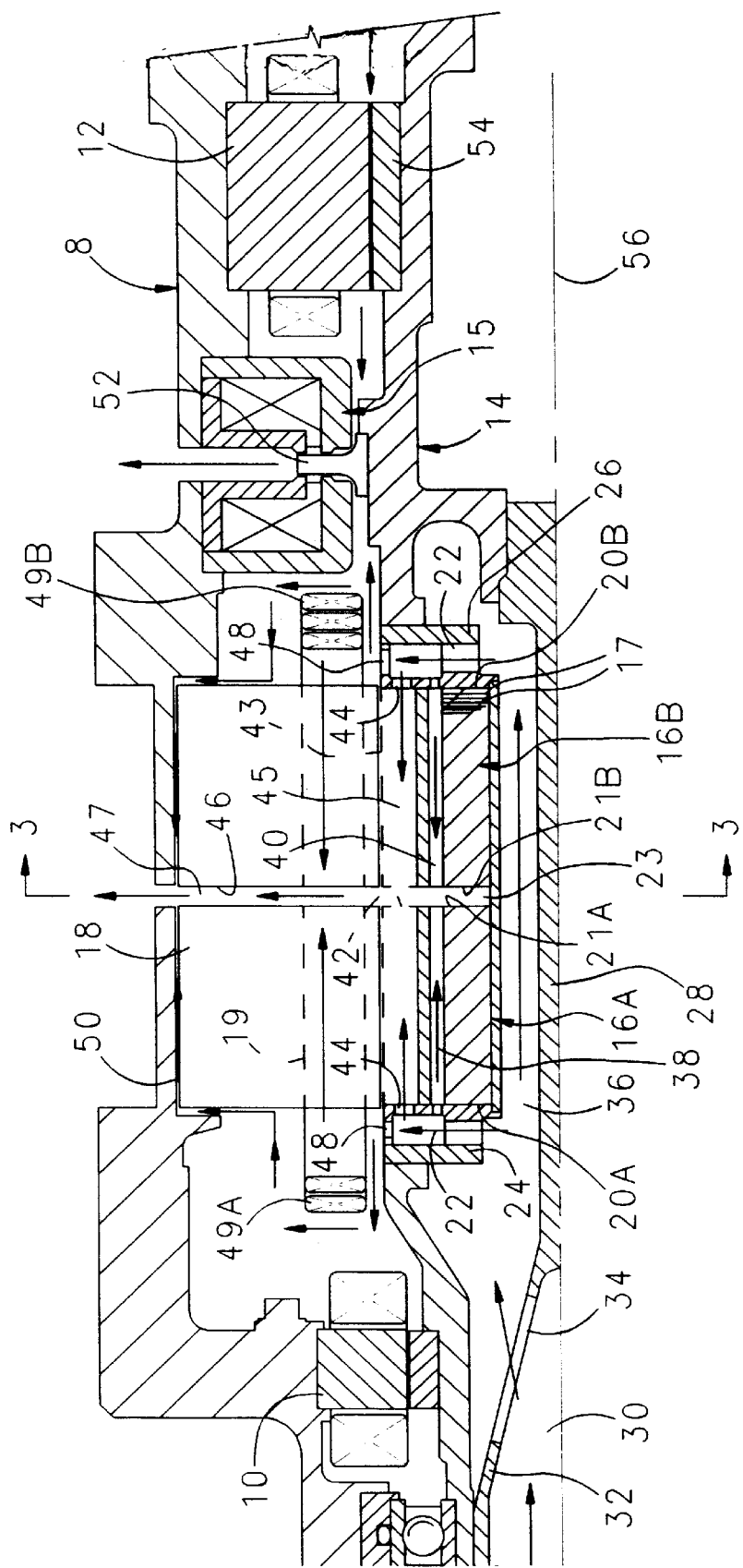
FIG. 1 is a somewhat schematic sectional view of a dynamoelectric machine made according to the invention.

An exemplary embodiment of the invention is illustrated in the drawings and will be described in the environment of an air cooled dynamoelectric machine. However, it is to be understood that the invention is not limited to such machines, but may be employed with efficacy in dynamoelectric machines that are cooled with other fluids as well.

Referring to FIG. 1, a dynamoelectric machine made according to the invention is seen to include a housing, generally designated 8 which mounts conventional, magnetic journal bearings 10 and 12 which journal a rotor, generally designated 14. The specific dynamoelectric machine is intended to operate as a generator and to this end, may be coupled to a source of rotary power (not shown). To provide for axial loads placed on the rotor 14 by its source of motive power, a magnetic thrust bearing, generally designated 15, is also included.

The rotor 14 includes two stacks 16A and 16B of thin laminations 17 made of a ferromagnetic material defining a rotor body and which is journaled by the magnetic bearings 10,12 for rotation within a laminated stator 18 having windings 19. Each of the stacks 16A, 16B includes a first end 20A, 20B that is axially spaced from a second end 21A, 21B. Pumping vanes 22 are located at the ends 20A, 20B of the stacks 16A, 16B, and a radially slotted spacer 23 is located between the ends 21A, 21B of the stacks 16A, 16B. Preferably, the spacer 23 is formed of a non-magnetic material, such as titanium, and has a ratio of Young's Modulus to density that is approximately the same as the ratio of Young's Modulus to density for the material of the laminations 17 to prevent relative growth between the spacer 23 and the ends 21A and 21B during rotation of the rotor. It is also preferred that the laminations 17 and the spacer 23 all be bonded with a polyimide based adhesive that has been cut to primer consistency to provide very thin bond joints. The stacks 16A, 16B, pumping vanes 22, and spacer 23 are held in assembled relation by clamp surfaces 24,26 forming part of the rotor 14. A tie bolt 28 extending between the clamp surfaces 24,26 provides the requisite clamping force.

The left-hand end 29 of the tie bolt 28 is enlarged and includes an interior chamber 30. The chamber 30 is in fluid communication with the ambient. A necked down section 32 of the tie bolt 28 extending from the enlarged end 29 includes a series of openings 34 (only one of which is shown) through which ambient air from the chamber 30 may pass into the interior of the machine. The lamination stacks 16A, 16B include an interior, annular passage 36 extending about the tie bolt 28 and cooling air is drawn in through the chamber 30 to be directed to the vanes 22 on the left-hand side of the machine as viewed in FIG. 1 with additional air passing through the annular passage 36 to the vanes 22 at the right-hand side of the stack 16.

Figure 3:
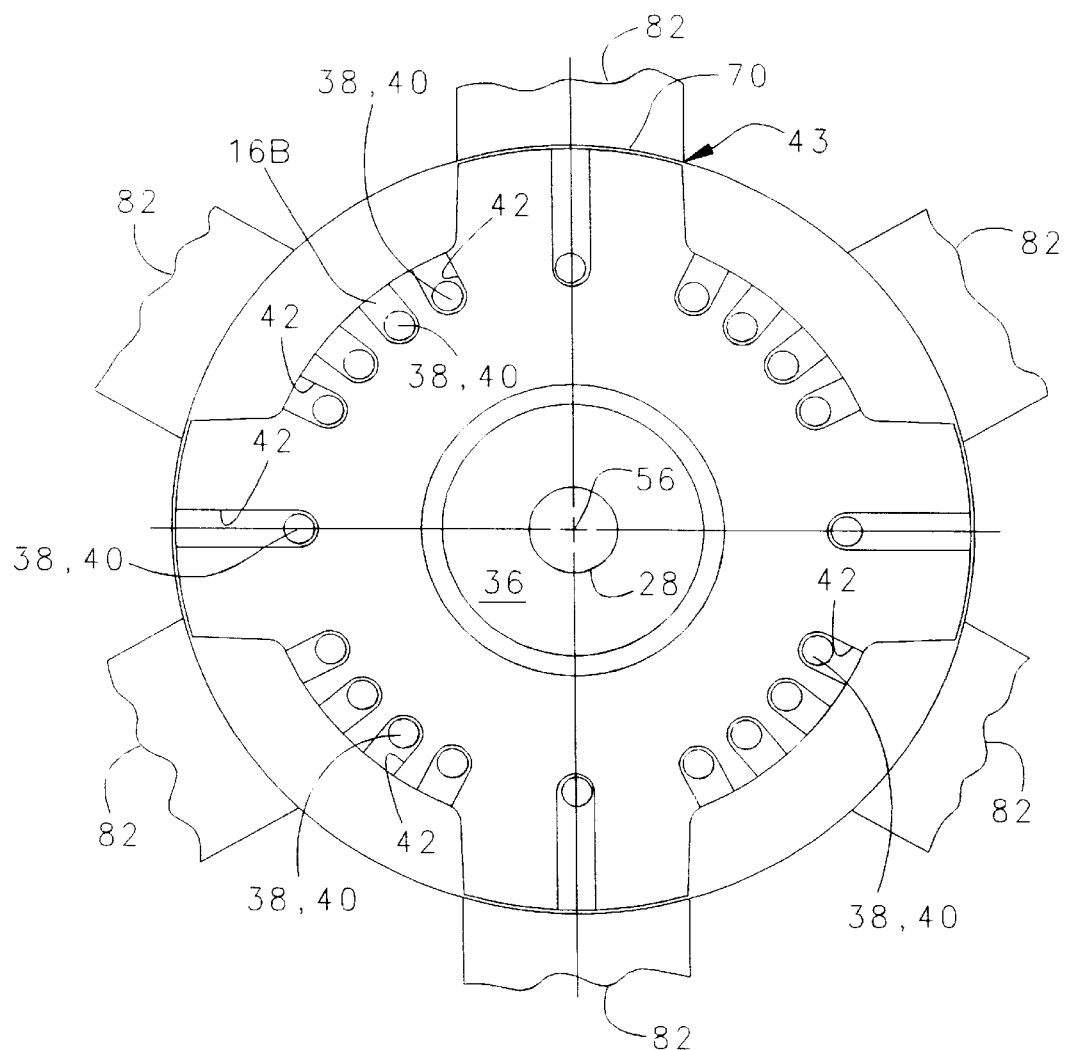
FIG. 3 is a fractional section view taken generally along line 3—3 in FIG. 1 showing a slotted spacer located generally centrally along the axis of the rotor employed in the machine of FIG. 1.

Axial passages 38 and 40 in the laminations 17 are generally, but not always, located between the poles (not shown in FIG. 1) of the rotor 14, receive air from the vanes 22 and discharge it through radially outwardly opening slots 42 in the spacer 23 to the air gap 43 between the rotor 14 and the stator 18, as seen in FIG. 3. In addition, as seen in FIG. 1, openings 44 in the end pieces of the rotor 14 allow the flow of air to recesses 45 between the rotor poles of the lamination stacks 16A, 16B. This air also flows to the center of the rotor 14.

As seen in FIG. 1, at least one radially extending discharge bore or passage 46 is centrally located in the stator 18 and the cooling air passing through the passages 38 and 40 and in the recesses 45 can be discharged to the exterior of the housing 8 via the passage 46. Preferably, a spacer 47 having the passages 46 in the form of slots is sandwiched between a pair of lamination stacks forming the stator 18. Preferably, the spacer 47 is formed of a non-magnetic material, such as titanium.

Openings 48 located on the rotor 14 radially outward of the openings 44 and the vanes 22 allow some air to be discharged along the sides of the stator 18 to cool the end turns 49A, 49B of the windings 19. The windings 19 in turn are spaced from one another and allow air flow through the stator 18 to the passages 46 for ultimate discharge through the exterior of the housing 8. In addition, the back iron 50 of the stator 18 may be spaced from the housing 8 or channeled so as to allow air that has passed through the end turns 49A, 49B of the winding 19 to flow along the back iron 50 in the space between the same and the housing 8 to the bore 46 for discharge.

Some air is permitted to pass on the left-hand side of the thrust disc 52 of the thrust-bearing 15 to be ejected from the housing, cooling the disc 52 and the left-hand magnet of the thrust-bearing 15. In this regard, the thrust disc 52, even though smooth-sided, acts as a pump for pumping such air.

It is also to be noted that some air is permitted to leak between various ones of the rotating components and the stationary components of the magnetic bearing 12 to provide cooling in that area. Air may be drawn in by the thrust disc 52 from the right-hand side of the structure and passes between the rotary component 54 of the magnetic journal bearing 12 to pass radially outwardly along the right-hand side of the thrust disc 52 to be ejected while cooling the right-hand magnet and the right side of the thrust disc 52 of the magnetic thrust-bearing 15. Such air also cools components of the magnetic journal bearing 12 as well.

Figure 2:
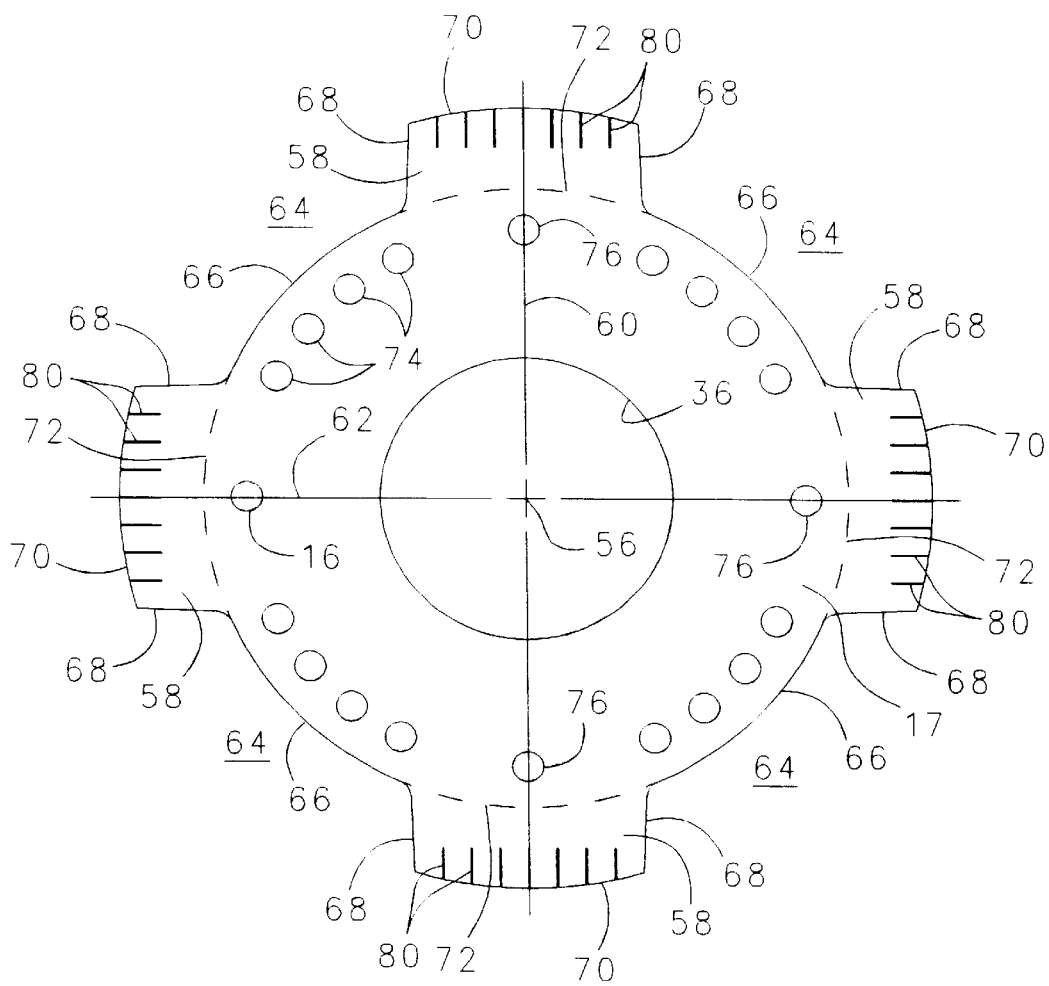
FIG. 2 is an elevational view of a lamination employed in a stack of laminations which in turn define the body of a rotor employed in the machine of FIG. 1.

Turning now to FIG. 2, one of the laminations 17 forming the stacks 16A, 16B is illustrated. Depending upon the axial length of the stacks 16A, 16B, a greater or lesser number of the laminations 17 are used.

Centrally of each lamination 17 is the annular passage 36 which is centered about the rotational axis 56 of the apparatus. Each lamination 17 includes a plurality of equally angularly spaced poles 58. As illustrated in FIG. 2, there are four such poles 58 and each is centered on a center line 60 or 62 that extends through the rotational axis 56. The center lines 60 and 62 are at 90 degrees to one another.

The poles 58 are separated by four, equal angularly spaced, axially extending recesses 64 having bottoms 66 which are generally concentric with the rotational axis 56. Each recess 64 includes opposed side walls 68 which are generally, but not truly, in the radial direction. In point of fact, the side walls 68 are such that the poles 58 remain of the same width or increase somewhat as one moves radially inward toward the axis 56 from the tips 70 of the poles 58. The tips 70 form part of a circle that is also concentric with the rotational axis 56. In addition, each pole 58 has a base 72 which may be considered to be an extension of the circle defining the bottoms 66 of the grooves 64 through each of the poles 58 as illustrated by dotted lines in FIG. 2.

For cooling purposes, underlying each of the recesses 64, in close proximity to the bottom 66 thereof, are a plurality of apertures 74 which define the coolant passages 38, 40. In addition, a further aperture 76 which also defines one of the coolant passages 38, 40 is located at the center line 60 or 62 for each of the poles 58. The aperture 76 may be as the same size as the apertures 74 and is located at or just radially inward of the base 72 of each of the poles 58. At the same time, it is located well radially outward of the rotational axis 56 and the passage 36 so as to be as close to the tips of the pole 70 as possible without being radially outward of the base 72 of the corresponding pole 58, at which location it would act as a disruption or narrowing of the magnetic flow path through the poles to cause magnetic inefficiency in the rotor. That is to say, by locating the aperture 76 at the position specified, maximum cooling of the poles 58 without disruption of the magnetic circuit of the machine is achieved. An additional consideration in the location of the apertures 74 and 76 is the stress in the lamination due to its rotation. The location is selected to minimize stresses around the apertures 74, 76.

Figure 4:
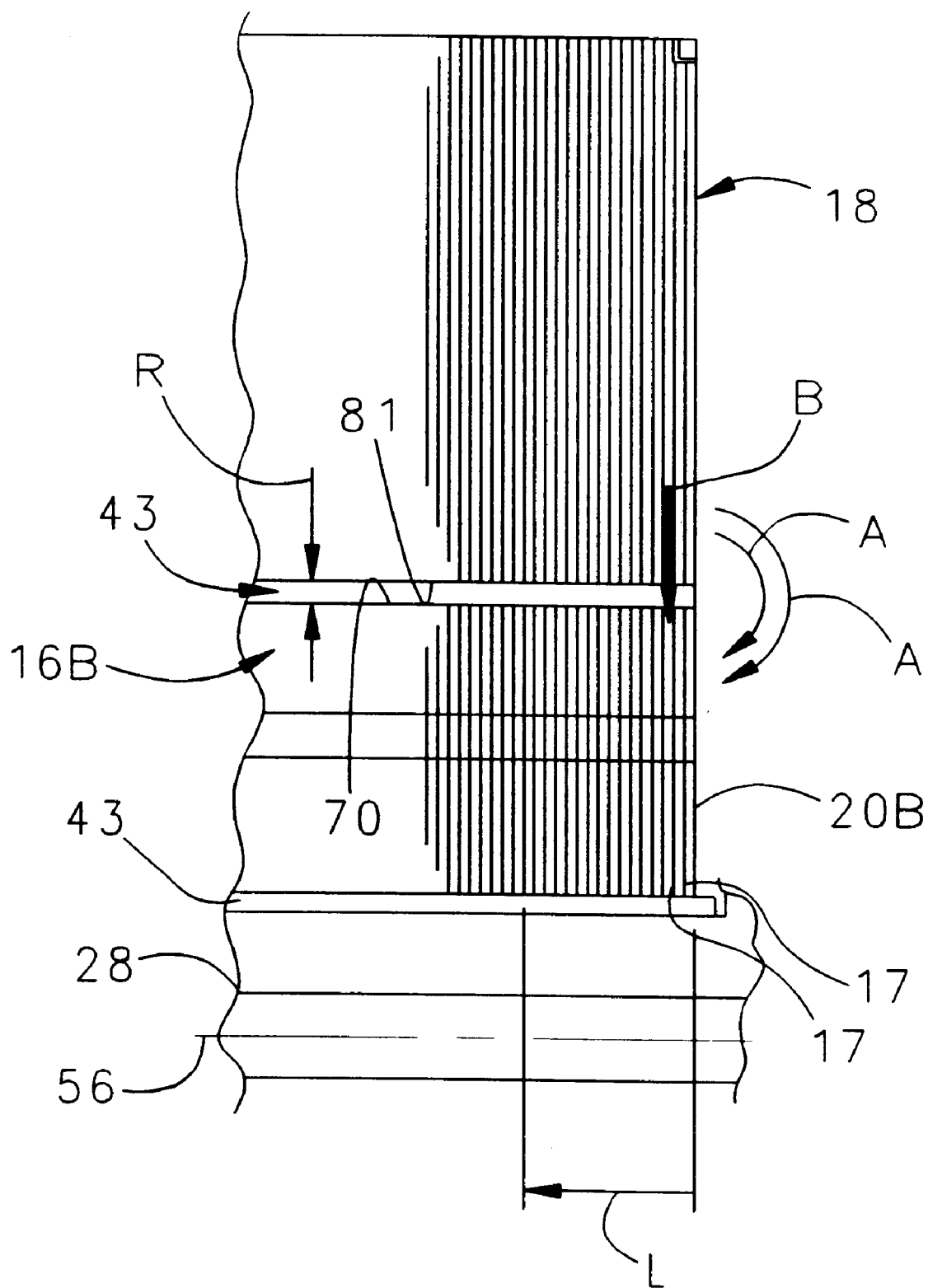
FIG. 4 is an enlarged fractional view showing one end of the stator and rotor employed in the machine of FIG. 1.

In some of the laminations 17, each of the poles 58 is provided with a plurality of slits or slots 80 across its entire circumferential width and extending radially inward from the tip 70. As seen in FIG. 4, magnetic flux fringes, indicated by arrows A, are generated at the ends 20A, 20B, 21A, 21B of the stacks 16A, 16B, by the magnetic flux, indicated by arrows B, passing through the radial air gap 43 between the tip 70 of each pole 58 and the inner tips 81 of the stator poles 82. The magnetic flux fringes create transverse eddy currents in each of the poles 58, and it has been determined that the slots 80 reduce the transverse eddy current losses in the poles 58 by interrupting the path of the transverse eddy currents. In a highly preferred embodiment, the slots 80 extend radially inward from the corresponding tip 70 a distance defined by the extent of the flux fringing. In general, it is preferred that the length of the slots 80 be in the range of 5 to 15 times the radial airgap distance R between the tips 70 of the rotor 14 and the inner tips 81 of the stator 18, with 10 times being preferred. If the slots 80 are too short, they may not function to adequately reduce eddy currents to the optimum degree. If they are too long, they may interfere with magnetic efficiency. Similarly, it is preferred that the laminations 17 having the slots 80 be limited to axial zones extending an axial distance L from each of the ends 20A, 20B, 21A, 21B, as seen in FIG. 4. The length L is defined by the extent of the magnetic flux fringing. In general, it is preferred that the length L be in the range of 5 to 15 times the radial air gap R between the rotor 14 and the stator 18, with 10 times being preferred. If the length L is too short, the slots 80 may not function to adequately reduce eddy current losses to the optimum degree. If the length L is too long, the slots 80 may interfere with magnetic efficiency to such an extent that they offset any benefits gained in reducing the eddy current losses.

While the slots 80 can be arranged in a number of ways to reduce transverse eddy current losses in the poles 58, in general, it is preferred the slots 80 will be parallel to one another and equally spaced from one another in each pole 58. Where an odd number of the slits 80 are employed in a given pole, it is preferred that the central slot 80 be on one of the center lines 60,62 and truly radial.

In the illustrated embodiment, each of the poles 58 includes seven of the slots 80. In this embodiment, the circumferential length of each pole 58 (that is, the distance from one of the sides 68 of the recess to the sides 68 of the adjacent recess 64 between which the pole 58 is located) is approximately $31/32$ of an inch.

While the slots 80 are shown in the rotor 14, it should be understood that the slots 80 may also be provided in the poles 82 of the stator 18 to reduce transverse eddy current losses in the stator 18, with the same preferred configurations for the slots 80 in the stator 18 as for the rotor 14.

It will thus be appreciated that a number of advantages accrue from the foregoing construction. For one, eddy current losses within the poles 58 are reduced by the presence of the slots 80. This in turn reduces cooling requirements, as well as energy requirements to pump coolant through the machine. Moreover, the location of the apertures 76 with respect to the poles 58 which they cool maximizes cooling efficiency by placing the coolant passage in close proximity to the pole without disrupting the magnetic circuit of the machine. Consequently, enhanced cooling is achieved without fear of loss of magnetic efficiency due to saturation as a result of narrowing of the magnetic flux path by the presence of a coolant passage. As a result of the reduction in eddy current losses and the improved positioning of the coolant passages defined by the aperture 76, the efficiency of overall machine operation is enhanced. It will also be appreciated that coolant flow from both ends 20A, 20B toward the center of the rotor 14 reduces the peak temperature in the rotor 14 as opposed to a coolant flow path entering one end and exiting the other.

What is claimed is:

1. A dynamoelectric machine comprising:
    a stator;
    a rotor journaled for rotation within said stator, said rotor including a body of magnetic material having a plurality of "n" circumferentially spaced, axially extending poles with radially outer tips and spaced by axially extending recesses having bottoms located radially inward of said tips;
    a plurality of more than "n" axially extending passages in said body, all of said passages being radially inward of the bottoms of said recesses, "n" of said passages being located on a radial center line of a corresponding one of said poles; and
    means for flowing a coolant through said passages whereby said poles may be cooled without interruption of a magnetic circuit extending between adjacent poles.

2. The dynamoelectric machine of claim 1 wherein all but said "n" passages are closely adjacent the bottom of said recesses.

3. The dynamoelectric machine of claim 1 wherein said flowing means comprise vanes on the ends of said rotor for flowing a gaseous coolant through said passages and further including radial passages extending to said axially extending passages from the periphery of said rotor generally centrally thereof.

4. The dynamoelectric machine of claim 1 wherein said body includes a plurality of laminations defining said poles and said pole tips include a plurality of circumferentially spaced slots extending radially inwardly and generally parallel to the center line of the corresponding pole.

5. A dynamoelectric machine comprising:
    a stator, the stator including at least two circumferentially spaced poles, each stator pole extending axially along the stator and having a radially inner surface; and
    a rotor mounted for rotation about an axis within said stator, the rotor including at least two circumferentially spaced poles, each rotor pole extending axially along the rotor and having a radially outer surface spaced from the radially inner surface of the stator poles by a radial gap R;

wherein at least one of said rotor and stator poles is formed from one or more stacks of laminations of magnetic material with the planes of the laminations extending nominally perpendicular to said axis, each of said one or more stacks having a first end axially spaced from a second end, one or more of said laminations of said one or more stacks including a plurality of slots arranged to reduce transverse eddy current losses in said at least one of the rotor and stator poles caused by magnetic flux fringes from the magnetic flux passing through the radial gap R, said one or more laminations limited to first and second axial zones extending an axial distance L from said first and second ends, respectively, toward the opposite end of the associated said one or more stacks, with L being in the range of 5 to 15 times the radial gap R.

6. The dynamoelectric machine of claim 5 wherein said at least one of said rotor and stator poles is formed from a plurality of said one or more stacks spaced axially from each other along said axis.

7. The dynamoelectric machine of claim 5 wherein said rotor poles are separated from one another by axially extending recesses having bottoms located radially inward of said radially outer surfaces of said rotor poles, and said rotor further comprises an axial coolant passage located on the center line of the corresponding pole and at or radially inward of the radial location of said bottoms.

8. The dynamoelectric machine of claim 5 wherein L is in the range of 5 to 10 times the radial gap R.

9. The dynamoelectric machine of claim 5 wherein L is 10 times the radial gap R.

10. A dynamoelectric machine comprising:

a stator;

a rotor journaled for rotation about an axis within said stator and including a rotor body having "n" axially extending poles spaced from one another by axially extending recesses between adjacent poles, each pole having a base and a tip; and an axial coolant passage at or radially inward of the base of each said pole and entirely radially outward of said axis at said location closer to said tip than to said axis.

11. The dynamoelectric machine of claim 10 wherein said body includes a plurality of laminations defining said poles and said pole tips include a plurality of circumferentially spaced slots extending radially inwardly and generally parallel to the center line of the corresponding pole.

12. The dynamoelectric machine of claim 8 further including a plurality of additional axial cooling passages in said body located just radially inward of said recesses.

* * * * *

UNITED STATES PATENT AND TRADEMARK OFFICE
CERTIFICATE OF CORRECTION

PATENT NO. : 6,091,168
DATED : July 18, 2000
INVENTOR(S) : David Halsey et al.

It is certified that error appears in the above-identified patent and that said Letters Patent is hereby corrected as shown below:

Column 1,
Line 11, insert the following:
-- This invention was made with government support under Contract No.: F33615-95-C-2509 with the United States Air Force. The government therefore has certain rights in this invention. --.

Signed and Sealed this

Seventh Day of February, 2006

JON W. DUDAS
*Director of the United States Patent and Trademark Office*